United States Patent
Lee et al.

(10) Patent No.: US 9,158,279 B2
(45) Date of Patent: Oct. 13, 2015

(54) SPATIAL LIGHT MODULATORS, HOLOGRAPHIC 3-DIMENSIONAL DISPLAY APPARATUSES INCLUDING THE SPATIAL LIGHT MODULATORS, AND METHODS OF MODULATING SPATIAL LIGHT

(75) Inventors: Gae-hwang Lee, Hwaseong-si (KR); Jae-eun Jung, Ansan-si (KR); Kyu-young Hwang, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 511 days.

(21) Appl. No.: 13/589,579

(22) Filed: Aug. 20, 2012

(65) Prior Publication Data

US 2013/0094069 A1 Apr. 18, 2013

(30) Foreign Application Priority Data

Oct. 13, 2011 (KR) .................. 10-2011-0104834

(51) Int. Cl.
  *G03H 1/02* (2006.01)
  *G03H 1/22* (2006.01)
  *G02F 1/1334* (2006.01)

(52) U.S. Cl.
  CPC .............. *G03H 1/02* (2013.01); *G03H 1/2294* (2013.01); *G02F 1/13342* (2013.01); *G03H 2001/0224* (2013.01); *G03H 2225/22* (2013.01); *G03H 2225/25* (2013.01)

(58) Field of Classification Search
  CPC .................... G02B 27/1046; G03H 2001/0224
  USPC ........................................ 359/1–35, 237–324
  See application file for complete search history.

(56) References Cited

U.S. PATENT DOCUMENTS

2008/0138013 A1* 6/2008 Parriaux ................. 385/37

FOREIGN PATENT DOCUMENTS

| JP | 05-273503 A | 10/1993 |
| JP | 2000-098358 A | 4/2000 |
| JP | 2000-314858 A | 11/2000 |
| KR | 20000077236 | 12/2000 |
| KR | 20110028819 A | 3/2011 |

* cited by examiner

*Primary Examiner* — Jennifer L. Doak
(74) *Attorney, Agent, or Firm* — Harness, Dickey & Pierce, PLC (57) ABSTRACT

A spatial light modulator may include a refraction layer including first and second regions with refractive indices different from each other; and/or a metal thin film on a lower face of the refraction layer configured to generate surface plasmons due to light incident on the metal thin film via the refraction layer. When first light is incident on the refraction layer, a phase difference between light reflected by the first and second regions may occur. A spatial light modulator may include a metal thin film and a refraction layer on the metal thin film. The refraction layer may include a first region with a first refractive index and a second region with a second refractive index different from the first refractive index. When first light is incident on the refraction layer, there may be a phase difference between light reflected from the first and second regions.

20 Claims, 7 Drawing Sheets

SPATIAL LIGHT MODULATORS, HOLOGRAPHIC 3-DIMENSIONAL DISPLAY APPARATUSES INCLUDING THE SPATIAL LIGHT MODULATORS, AND METHODS OF MODULATING SPATIAL LIGHT

CROSS-REFERENCE TO RELATED APPLICATION(S)

This application claims priority from Korean Patent Application No. 10-2011-0104834, filed on Oct. 13, 2011, in the Korean Intellectual Property Office (KIPO), the entire contents of which are incorporated herein by reference.

BACKGROUND

1. Field

Example embodiments relate to spatial light modulators using surface plasmons, holographic 3-dimensional display apparatuses including the spatial light modulators, and/or methods of modulating spatial light.

2. Description of Related Art 3-dimensional (3D) image display devices that realistically and effectively display an image are increasingly required in various fields, such as fields pertaining to medical images, games, advertisements, education, and the military. Accordingly, as a method of displaying a 3D image, a holographic method or a stereoscopic method is widely studied.

A holographic method uses a principle that a coherent signal obtained by overlapping incident light from an object and coherent reference light is recorded and reproduced. The holographic method is an ideal display method for realizing a 3D image. Since Dennis Gabor, an English scientist, developed the first hologram in the 1940s, research into holography has been conducted by many scientists. Recently, a variety of holographic techniques for displaying, for example, a pulsed laser hologram for capturing a dynamic image, a stereohologram having wide spatial scene display and wide viewing angle, an embossed hologram that can be mass produced, a natural color hologram displaying natural colors, and a digital hologram using a digital imaging device, and electronic holography for displaying an electronic hologram, have been developed. Electronic holography, used since 1990, is an imaging technique of the next generation. According to electronic holography, an image of an object is reproduced on a display device by scanning an image of the object in units of pixels to form a hologram, sampling and transmitting data contained in the hologram, and reproducing the hologram from the transmitted data.

However, an amount of data contained in a hologram is too large to be sampled and transmitted, and thus research into generating a hologram via a computer and displaying the hologram via an electro-optical method has been conducted. In addition, research into various hologram systems has been conducted to overcome the limits of a hologram. For example, in order to reduce an amount of calculation data of a hologram, research into displaying a hologram by eye-tracking, and research into improving performance of a hologram optical device including a spatial light modulator and a hologram recording method and applying the improvement to electronic holography, have been conducted.

SUMMARY

Example embodiments may provide spatial light modulators for changing a phase of light by using surface plasmons.

Example embodiments may provide 3-dimensional (3D) holographic displays to which the spatial light modulators using surface plasmons are applied.

Example embodiments may provide methods of modulating spatial light that change phases of the light by using surface plasmons.

In some example embodiments, a spatial light modulator may comprise a refraction layer including a first region and a second region with refractive indices different from each other; and/or a metal thin film on a lower face of the refraction layer that is configured to generate surface plasmons due to light incident on the metal thin film via the refraction layer. When first light is incident on the refraction layer, a phase difference between light reflected by the first region and light reflected by the second region may occur.

In some example embodiments, the first region may be a region in which a refractive index is changed due to emission of second light including hologram information before the first light is incident on the first region.

In some example embodiments, the change of the refractive index may differ depending on an intensity of the second light.

In some example embodiments, the refraction layer may be formed of vanadium oxide or photochromic material.

In some example embodiments, the spatial light modulator may further comprise a dielectric layer on a lower face of the metal thin film.

In some example embodiments, the spatial light modulator may further comprise a prism on the refraction layer that is configured to control an incident angle of the first light toward the metal thin film.

In some example embodiments, an incident plane of the prism may comprise a plane parallel to a transmittance plane of the prism.

In some example embodiments, the spatial light modulator may further comprise a prism array on the refraction layer in which a plurality of prisms are aligned to control an incident angle of the first light toward the metal thin film.

In some example embodiments, the spatial light modulator may further comprise a transparent electrode on the refraction layer that is configured to apply a voltage to form an electric field through the refraction layer.

In some example embodiments, the refraction layer may be formed from one or more of photorefractive crystals, photorefractive polymers, photorefractive polymer dispersed liquid crystals (PDLC), photorefractive liquid crystals (LC), and Mott insulators.

In some example embodiments, the spatial light modulator may further comprise a prism on the transparent electrode that is configured to control an incident angle of the first light toward the metal thin film.

In some example embodiments, the phase difference may include a phase difference due to a refractive index of the refraction layer, where the first light is transmitted, and a phase difference due to surface plasmons.

In some example embodiments, a holographic three-dimensional (3D) display apparatus may comprise a recording light source unit configured to emit recording light; a first spatial light modulator configured to time-sequentially modulate the recording light emitted from the recording light source unit to include hologram information corresponding to a 3D image spatially divided into a plurality of portions; a second spatial light modulator corresponding to the spatial light modulator of claim 1, including a plurality of regions corresponding to the plurality of portions, wherein at least one region among the plurality of regions is configured to be illuminated with the modulated recording light to form a hologram; and/or a reproducing light source unit configured to produce surface light and configured to emit the surface light to the second spatial light modulator.

In some example embodiments, the may further comprise a scanning optical unit configured to replicate at a reduced scale a hologram generated by the recording light source unit, time-sequentially modulated by the first spatial light modulator, and configured to transmit the hologram to corresponding regions from among the plurality of regions of the second spatial light modulator.

In some example embodiments, a method of modulating spatial light may comprise placing a refraction layer, including a first region and a second region, on a metal thin film; changing a refractive index of the first region by irradiating first light including hologram information onto the first region; and/or generating surface plasmons at an interface between the refraction layer and the metal thin film when second light is incident on the refraction layer, and causing light reflected by the first region and light reflected by the second region to have a phase difference.

In some example embodiments, the change of refractive index may be different according to an intensity of the first light.

In some example embodiments, the refraction layer may be formed of vanadium oxide or photochromic material.

In some example embodiments, the refraction layer may be formed of material in which a refractive index is changed due to the first light under an electric field.

In some example embodiments, the refraction layer may be formed from one or more of photorefractive crystals, photorefractive polymers, photorefractive polymer dispersed liquid crystals (PDLC), photorefractive liquid crystals (LC), and Mott insulators.

In some example embodiments, the phase difference may include a phase difference due to a refractive index of the refraction layer, where the second light is transmitted, and a phase difference due to surface plasmons.

In some example embodiments, a spatial light modulator may comprise a metal thin film and/or a refraction layer on the metal thin film. The refraction layer may include a first region with a first refractive index and a second region with a second refractive index different from the first refractive index. When first light is incident on the refraction layer, there may be a phase difference between light reflected from the first region and light reflected from the second region.

In some example embodiments, the refraction layer may include vanadium oxide.

In some example embodiments, the refraction layer may include photochromic material.

In some example embodiments, the spatial light modulator may further comprise a prism on the refraction layer. The prism may be configured to control an incident angle of the first light toward the metal thin film.

In some example embodiments, the spatial light modulator may further comprise a prism array on the refraction layer. The prism array may be configured to control an incident angle of the first light toward the metal thin film.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1:
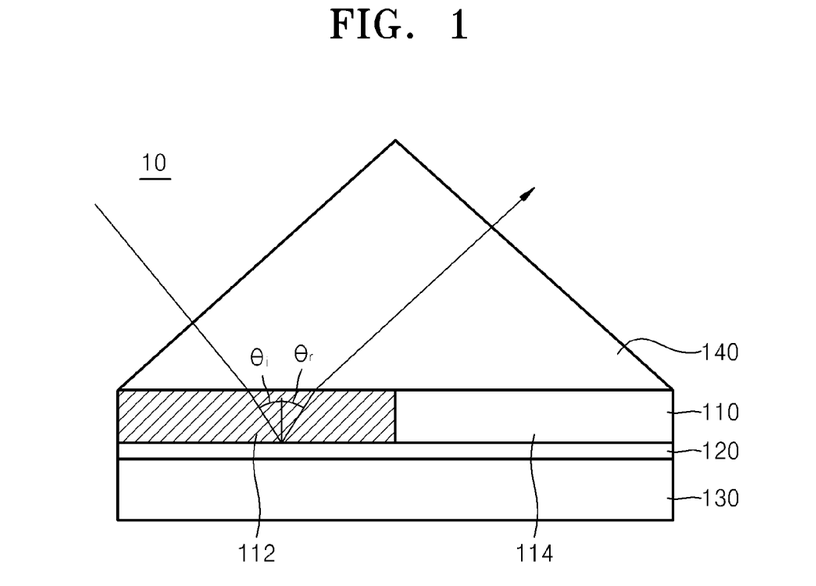
FIG. 1 is a drawing illustrating a spatial light modulator according to some example embodiments.

FIG. 1 is a drawing that illustrates a spatial light modulator 10 according to some example embodiments.

Referring to FIG. 1, the spatial light modulator 10 includes a refraction layer 110 including a first region 112 and a second region 114 with refractive indices different from each other, and a metal thin film 120 placed on a lower face of the refraction layer 110 and generating surface plasmons due to light that is incident on the metal thin film 120 through the refraction layer 110.

The refraction layer 110 may be formed of a material of which a refractive index is changed according to an intensity of incident light. The spatial light modulator 10 of FIG. 1 is a device in which light with hologram information is recorded on the refraction layer 110, and then when reproducing light (also referred to as "light") is incident on the refraction layer 110, light corresponding to the hologram information is output. Thus, the refractive index of the first region 112 may be changed as the light with hologram information is incident on the first region 112 of the refraction layer 110 before the reproducing light is incident on the spatial light modulator 10. The light with hologram information may be incident in the same direction as that in which the reproducing light is incident. Also, because the refractive indices of the first region 112 and the second region 114 of the refraction layer 110 are different from each other, when the reproducing light is incident on the spatial light modulator 10, light reflected by the first region 112 and light reflected by the second region 114 have a phase difference. The reflected light, here, is light corresponding to a hologram image.

The refraction layer 110 may be formed of a vanadium oxide or a photochromic material. Vanadium oxides have various properties ranging from a semiconductor to a conductor depending on temperature, thus refraction indices thereof undergo substantial changes according to change of states. When light with hologram information is irradiated on a vanadium oxide, as described above, a refractive index change may be induced by controlling a temperature of the vanadium oxide. Photochromic materials are materials of which an absorption spectrum is changed according to recording light. Therefore, a refractive index change may be induced by controlling an absorption spectrum of a photochromic material.

The metal thin film 120 is positioned on the lower face of the refraction layer 110 and may be formed of a metal that readily generates surface plasmons. For example, the metal thin film 120 may be formed of a metal such as gold (Au), silver (Ag), or aluminum (Al). In addition, a metal such as copper (Cu), lead (Pb), indium (In), tin (Sn), or cadmium (Cd), or any of various other metal may be used. A thickness of the metal thin film 120 may be about several hundred nanometers or less.

A phase of the light that is incident on the refraction layer 110 is changed due to the refractive index of the refraction layer 110 where the light is transmitted. Also, when the light is incident through the refraction layer 110 on the metal thin film 120, and when a relationship between the light, the refraction layer 110, and the metal thin film 120 satisfies conditions for generating surface plasmons, the surface plasmons are generated at an interface between the refraction layer 110 and the metal thin film 120. The surface plasmons indicate charge density oscillations resulted by excitation of free electrons inside the metal thin film 120 by incident light energy as an electromagnetic field mode that may run along the interface of the metal thin film 120 and the refraction layer 110. Such surface plasmons are transverse magnetic polarized waves that propagate along the interface and that are greatest in strength at the interface of the metal thin film 120 and the refraction layer 110 but are exponentially reduced in strength in a direction perpendicular to the surface of the metal thin film 120. Due to generation of the surface plasmons described above, the light is reflected with its phase changed on the metal thin film 120.

Moreover, the light reflected by the metal thin film 120 is output with its phase also changed depending on whether the light passes through the first region 112 of the refraction layer 110 or passes through the second region 114 of the refraction layer 110 where the light is retransmitting.

Therefore, the incident light is output from the spatial light modulator 10 with its phase changed according to the refractive index of the refraction layer 110 and its phase changed according to surface plasmons. As the surface plasmons are also generated according to the refractive indices of the refraction layer 110, the phase change of the light may be controlled by the refractive indices of the refraction layer 110.

For example, when a wavelength of the light that is incident on the spatial light modulator 10 is $\lambda_0$, a first phase change ($\Delta\phi_i$) of the light before arriving at the metal thin film 120 is as defined in Equation (1):

$$\Delta\varphi_i = \frac{4\pi d_i \Delta n_i}{\lambda_0 \cos\theta_i} \tag{1}$$

Here, $d_i$ is a thickness of the refraction layer 110 where the light is transmitted before arriving at the metal thin film 120, $n_i$ is the refractive index of the refraction layer 110 where the light is transmitted before arriving at the metal thin film 120, and $\theta_i$ is an angle at which the light passes through the refraction layer 110. Thus, when the light is incident on the refraction layer 110, the first phase change of the light occurs due to the refractive index of the refraction layer 110 where the light is transmitted before arriving at the metal thin film 120.

When the conditions for generating surfaces plasmon are satisfied by the light, the refractive index of the refraction layer 110 where the light is transmitted, and a refractive index of the metal thin film 120, surface plasmons are generated at the interface between the refraction layer 110 and the metal thin film 120. Also, a reflection coefficient of the metal thin film 120 due to surface plasmons is as defined in Equation (2):

$$r = \frac{r_{12} + r_{13}\exp(2ik_{z2}d)}{1 + r_{12}r_{13}\exp(2ik_{z2}d)} \quad (2)$$

Here, $r_{12}$ is a reflection coefficient of the metal thin film 120 with respect to the refraction layer 110, $r_{13}$ is a reflection coefficient of a dielectric layer 130 with respect to the refraction layer 110, $r_{23}$ is a reflection coefficient of the dielectric layer 130 with respect to the metal thin film 120, $k_{z2}$ is a wave number with respect to a running direction of surface plasmons generated at the interface between the refraction layer 110 and the metal thin film 120, and d is the thickness of the metal thin film 120. Accordingly, a phase of surface plasmons ($\phi_s$) is as defined in Equation (3):

$$\phi_s = \arg(r) \quad (3)$$

Therefore, a second phase change of the light due to surface plasmons ($\Delta\phi_s$) is as defined in Equation (4):

$$\Delta\phi_s = \phi_s(n_s + \Delta n_s) - \phi_s(n_s) \quad (4)$$

Here, $n_s$ is a refractive index of the refraction layer 110 where the light is transmitted, and $\Delta n_s$ is a variation in a refractive index of the refraction layer 110 where the light is transmitted.

Also, light reflected from the metal thin film 120 is output through the refraction layer 110. Thus, before being output from the refraction layer 110, the light has a third phase change ($\Delta\phi_r$) due to the refraction layer 110 as defined in Equation (5):

$$\Delta\varphi_i = \frac{4\pi d_r \Delta n_r}{\lambda_0 \cos\theta_r} \quad (5)$$

Here, $d_r$ is a thickness of the refraction layer 110 where the light is incident on before being output from the metal thin film 120, $n_r$ is a refractive index of the refraction layer 110 where the light is transmitted before arriving at the metal thin film 120, and $\theta_r$ is an angle at which the light passes through the refraction layer 110.

Thus, a phase change of the light due to the spatial light modulator 10 is as defined in Equation (6):

$$\Delta\phi = \Delta\phi_i + \Delta\phi_s + \Delta\phi_r \quad (6)$$

As mentioned above, the light incident on the spatial light modulator 10 is reflected with its phase changed due to the refractive index of the refraction layer 110 where the light is transmitted and surface plasmons. As a result, when light is incident on the first region 112 and the second region 114 of the refraction layer 110, which have different refractive indices, a phase difference between light reflected from the first region 112 and light reflected from the second region 114 may occur. The phase difference mentioned above may include a phase difference due to a difference between the refractive indices of the refraction layer 110 and a phase difference due to a difference of reflection coefficients of surface plasmons.

Therefore, modulating a phase of the light is convenient when the refraction layer 110 including regions with refractive indices different from each other is used, because light beams with different phases are reflected according to the regions of the refraction layer 110. Also, implementing the spatial light modulator 10 with a small volume is possible as the phase of the light is modulated by surface plasmons between the refraction layer 110 and the metal thin film 120.

Moreover, the spatial light modulator 10 may selectively include the dielectric layer 130 on a lower face of the metal thin film 120 to satisfy conditions for generating surface plasmons. A refractive index of the dielectric layer 130 may vary according to the refractive indices of the refraction layer 110, and a material for the dielectric layer 130 is not particularly limited. For example, when surface plasmons are generated on the metal thin film 120 using only the refraction layer 110, or when the dielectric layer 130 is to have a refractive index of 1, a separate dielectric layer 130 is not necessary.

Also, the spatial light modulator 10 may further include a prism 140 for controlling an incidence angle of the incident light. The prism 140 may be placed on the refraction layer 110. If the refractive indices of the refraction layer 110 are too big, the light is refracted by the refraction layer 110, no matter how big the incidence angle of the light with respect to the refraction layer 110 is. Accordingly, an incidence angle with respect to the metal thin film 120 decreases and thus the light is not incident on the metal thin film 120 at a desired angle. Thus, the prism 140 may be used in order for the light to be incident on the metal thin film 120 at a desired angle. If the light may be incident at an angle at which surface plasmons may be generated without the prism 140, the prism 140 is unnecessary. The number of prisms 140 applied to the spatial light modulator 10 may be one.

Figure 2:
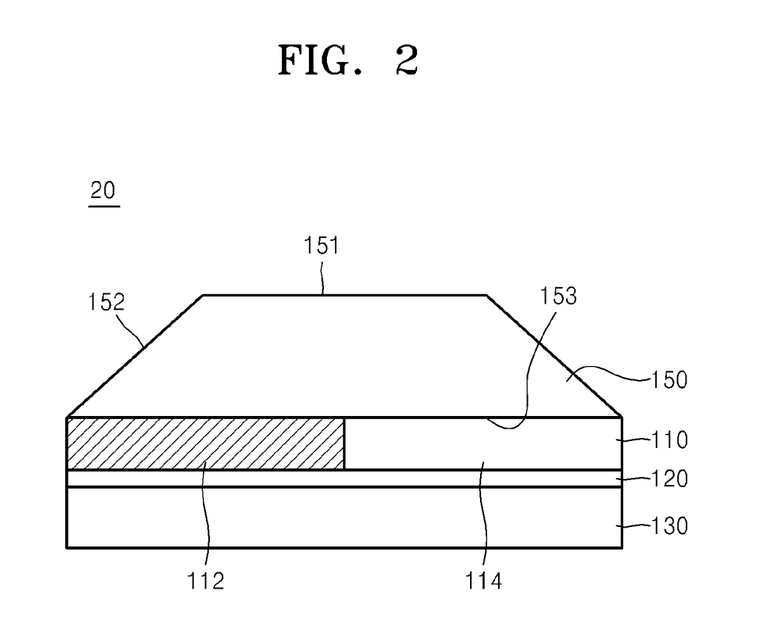
FIG. 2 is a drawing illustrating a spatial light modulator including a prism different from that of the spatial light modulator of FIG. 1.

A cross section of the prism 140 illustrated in FIG. 1 is a triangle. However, other shapes are possible depending on requirements of an angle at which light is to be incident on the metal thin film 120. FIG. 2 is a drawing illustrating a spatial light modulator 20 including a prism 150 different from that of the spatial light modulator 10 of FIG. 1. The prism 150 generally has a light incidence plane that is not parallel to a light transmittance plane. But, as illustrated in FIG. 2, a light incidence plane 151, which is a part of the light transmittance plane of the prism 150, may be parallel to a light transmittance plane 153 of the prism 150, and an incidence plane 152, which is the rest of the light transmittance plane of the prism 150, may not be parallel to the light transmittance plane 153.

Figure 3:
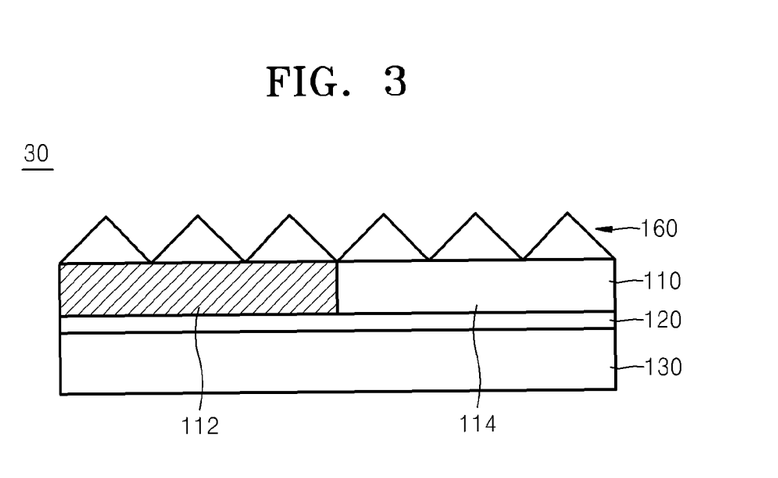
FIG. 3 is a drawing illustrating a spatial light modulator including a prism array according to some example embodiments.

Meanwhile, a size of a prism is proportional to a surface area of a spatial light modulator. Thus, a big-size prism may be used to manufacture a spatial light modulator having a large surface area. However, a prism array, wherein a plurality of prisms is aligned, may be used to reduce or effectively prevent an increase in the volume of a spatial light modulator. FIG. 3 is a drawing illustrating a spatial light modulator 30 including a prism array 160 according to some example embodiments. As illustrated in FIG. 3, a volume of the spatial light modulator 30 having even a large surface area may be reduced when the prism array 160 is used.

Figure 4:
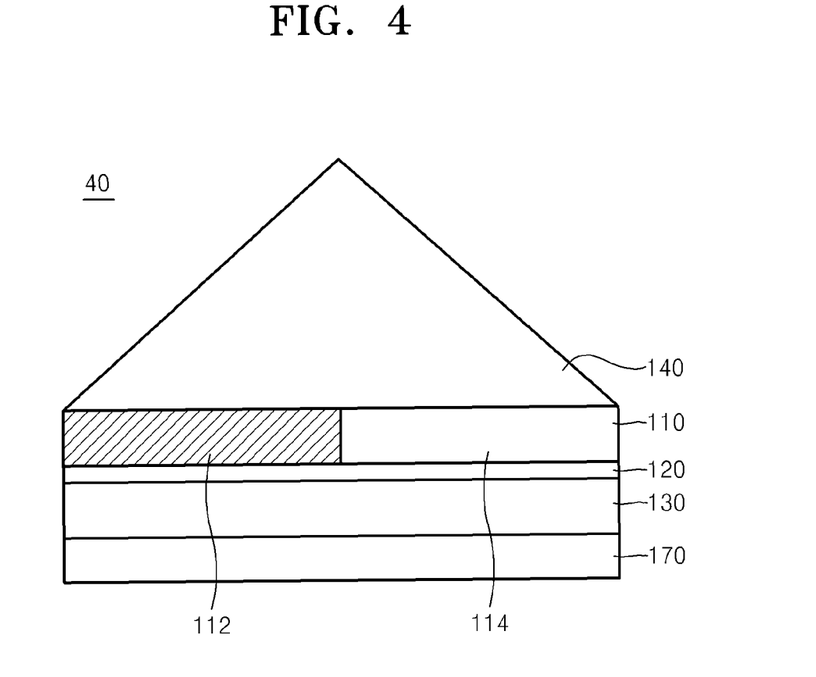
FIGS. 4 and 5 are drawings illustrating spatial light modulators according to some example embodiments.
Figure 5:
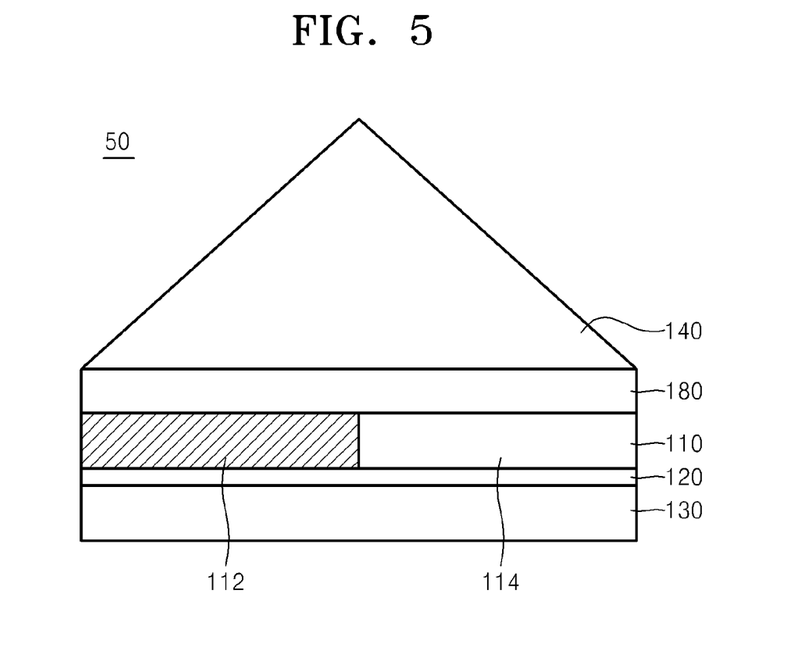

Also, materials for binding the prism 140 and elements near the prism 140, for example, the refraction layer 110, substrates 170 and 180 of FIGS. 4 and 5, and a transparent electrode 230, may be added.

A spatial light modulator may include other substrates to increase convenience in its manufacturing. FIGS. 4 and 5 are drawings illustrating spatial light modulators 40 and 50 including substrates. The substrates 170 and 180 may be formed of a transparent material. For example, a glass substrate or a plastic substrate, or any of various other materials, may be used.

As illustrated in FIG. 4, the spatial light modulator 40 may be manufactured by sequentially stacking the dielectric layer 130, the metal thin film 120, the refraction layer 110, and the prism 140 on the substrate 170. If not necessary, at least one of the dielectric layer 130 and the prism 140 may not be stacked.

Or, as illustrated in FIG. 5, the prism 140 may be stacked on an upper face of the substrate 180, and the refraction layer 110, the metal thin film 120, and the dielectric layer 130 may be sequentially stacked on a lower face of the substrate 180. If not necessary, at least one of the prism 140 and the dielectric layer 130 may not be stacked. In FIGS. 4 and 5, a spatial light modulator including one substrate is described, but the spatial light modulator may include two or more substrates.

A refractive index of a partial region of a refraction layer of a spatial light modulator described above may be changed without a voltage application. Hereinafter, a spatial light modulator in which a refractive index of a refraction layer may be changed with a voltage application will be described.

Figure 6:
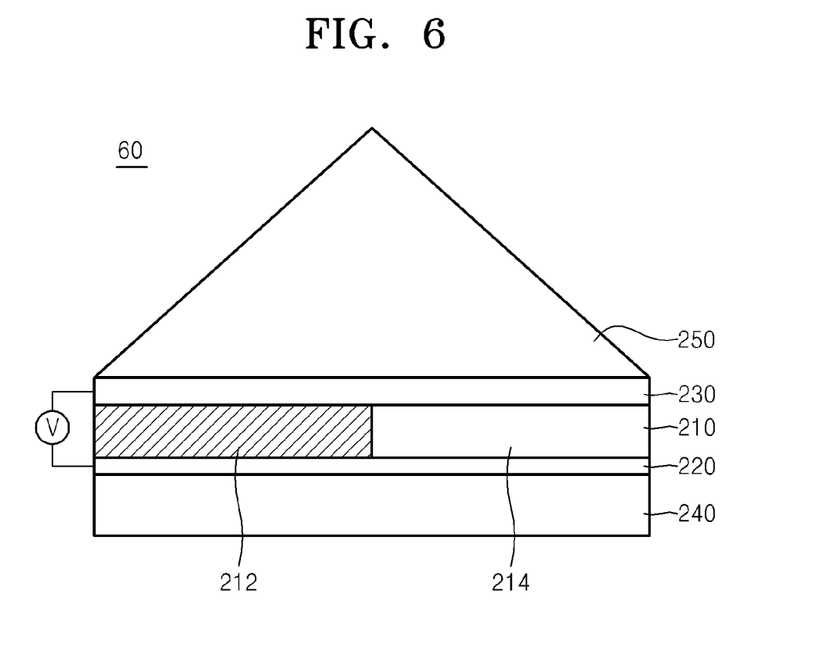
FIG. 6 is a drawing illustrating a spatial light modulator according to some example embodiments.

FIG. 6 is a drawing illustrating a spatial light modulator 60 according to some example embodiments. Referring to FIG. 6, the spatial light modulator 60 includes a refraction layer 210 including a first region 212 and a second region 214 with refractive indices different from each other. Also, the spatial light modulator 60 includes, on a lower face of the refraction layer 210, a metal thin film 220 for generating surface plasmons due to light that is incident on the metal thin film 220 and, on an upper face of the refraction layer 210, a transparent electrode 230.

The refraction layer 210 may include the first region 212 and the second region 214 with refractive indices different from each other. For example, the refractive index of the first region 212 may be changed as recording light with hologram information is incident on the first region 212 while an electric field is formed through the refraction layer 210, before reproducing light is incident on the spatial light modulator 60. Thus, when the light is incident on the refraction layer 210, light reflected by the first region 212 and light reflected by the second region 214 have a phase difference.

The refraction layer 210 may be formed of a material of which a refractive index may be changed according to an intensity of recording light with hologram information while an electric field is formed. For example, the refraction layer 210 may be formed of photorefractive crystals such as any of Fe:LiNbO3, Fe:KnbO3, Bi12SiO2, Bi12GeO2, strontium-barium niobate (SBN), etc., a photorefractive polymer, photorefractive polymer dispersed liquid crystals (PDLC), photorefractive liquid crystals (LC), or Mott insulators such as VO$_2$.

The metal thin film 220 may be a metal that readily generates surface plasmons. For example, the metal thin film 220 may be formed of a metal such as gold (Au), silver (Ag), or aluminum (Al). In addition, a metal such as copper (Cu), lead (Pb), indium (In), tin (Sn), cadmium (Cd), or any of various other metals may be used. The metal thin film 220 acts as a pathway of surface plasmons but it may also act as an electrode for forming an electric field through the refraction layer 210 by being connected to a power supply. A thickness of the metal thin film 220 may be about several hundred nanometers or less.

The transparent electrode 230 may be formed of aluminum (Al), gold (Au), or indium tin oxide (ITO), or any of various other materials, but is not limited thereto, and any electrode that is transparent may be used. Here, the metal thin film 220 may function as another electrode. Thus, when a voltage is applied to the metal thin film 220 and the transparent electrode 230, an electric field is formed through the refraction layer 210.

Moreover, the spatial light modulator 60 may selectively have a dielectric layer 240 mounted on a lower face of the metal thin film 220 to satisfy conditions for generating surface plasmons. A refractive index of the dielectric layer 240 may be different according to the refractive indices of the refraction layer 210, and a material for the dielectric layer 240 is not particularly limited. For example, when surface plasmons are generated on the metal thin film 220 using only the refraction layer 210, or when the dielectric layer 240 is to have a refractive index of 1, a separate dielectric layer 240 is not necessary.

Also, the spatial light modulator 60 may further include a prism 250 for controlling an incidence angle of incident light. The prism 250 may be placed on the transparent electrode 230. The prism 250 may have a shape other than a triangle for its cross section as long as the incident angle may be controlled. If the light may be incident at an angle at which surface plasmons may be generated without the prism 250, the prism 250 is unnecessary. The prism 140 may be applied to the spatial light modulator by itself. A size of a prism is proportional to a surface area of a spatial light modulator. Thus, a big size prism may be used to manufacture a spatial light modulator having a large surface area, but a prism array, wherein a plurality of prisms is aligned, may be used to reduce or effectively prevent an increase in the volume of a spatial light modulator.

Figure 7:
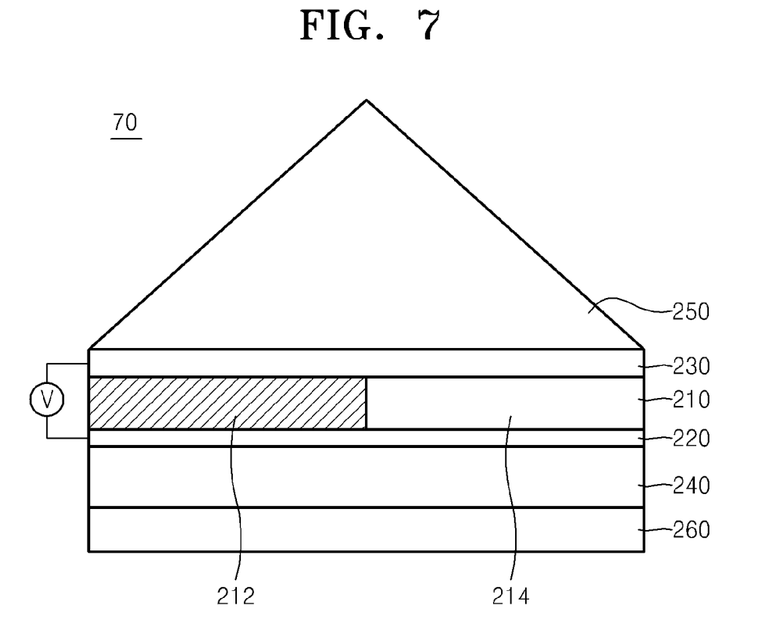
FIGS. 7 and 8 are drawings illustrating spatial light modulators according to some example embodiments.
Figure 8:
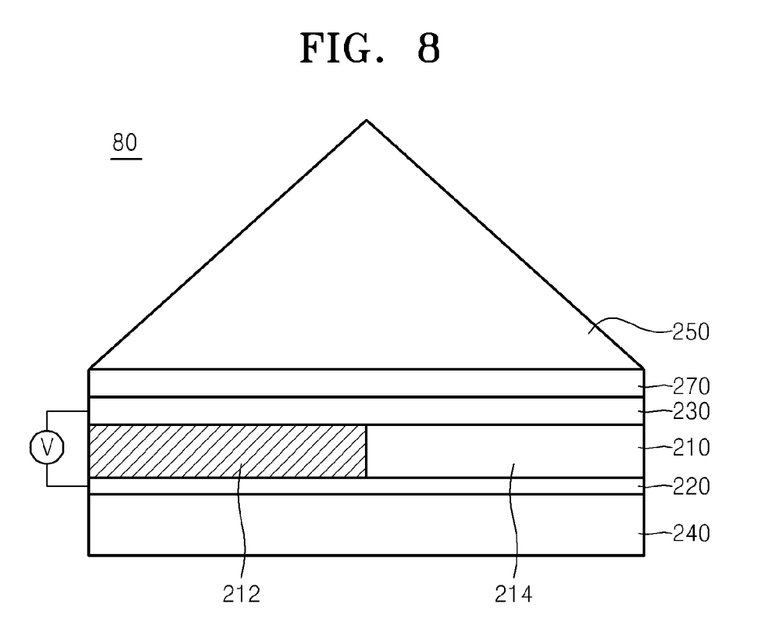

A spatial light modulator may include other substrates to increase convenience in its manufacturing. FIGS. 7 and 8 are drawings illustrating spatial light modulators 70 and 80 including substrates. Substrates 260 and 270 may be formed of a transparent material. For example, a glass substrate or a plastic substrate, or any of various other materials, may be used.

As illustrated in FIG. 7, the spatial light modulator 70 may be manufactured by sequentially stacking a dielectric layer 240, a metal thin film 220, a refraction layer 210, a transparent electrode 230, and a prism 250 on an upper face of the substrate 260. If not necessary, at least one of the dielectric layer 240 and the prism 250 may not be stacked.

However, in the spatial light modulator 80 illustrated in FIG. 8, the prism 250 may be stacked on an upper face of the substrate 270, and the transparent electrode 230, the refraction layer 210, the metal thin film 220, and the dielectric layer 240 may be sequentially stacked on a lower face of the substrate 270. If not necessary, at least one of the prism 250 and the dielectric layer 240 may not be stacked. In FIGS. 7 and 8, a spatial light modulator including one substrate is described. However, a spatial light modulator may include two or more substrates.

Figure 9A:
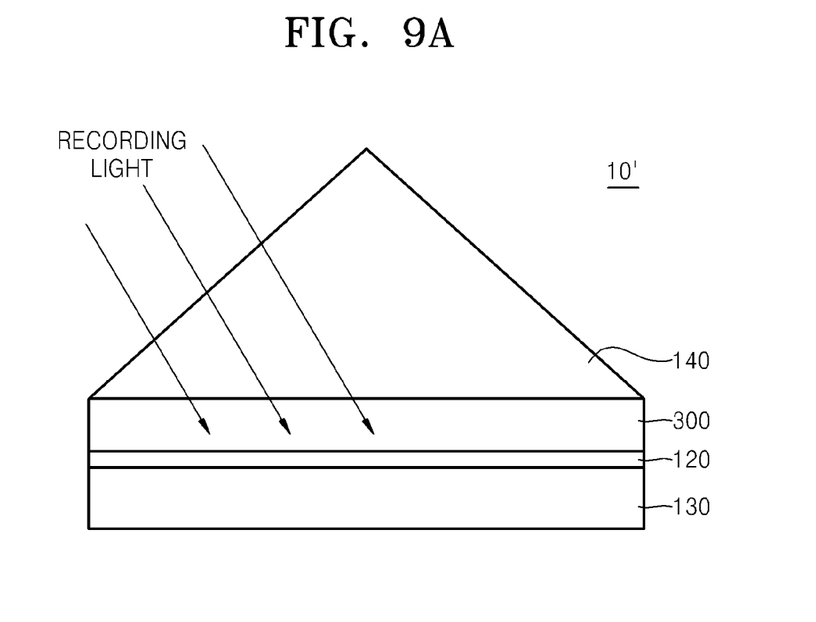
FIGS. 9A through 9C are drawings describing a process in which a spatial light modulator outputs phase-changed light according to some example embodiments.
Figure 9B:
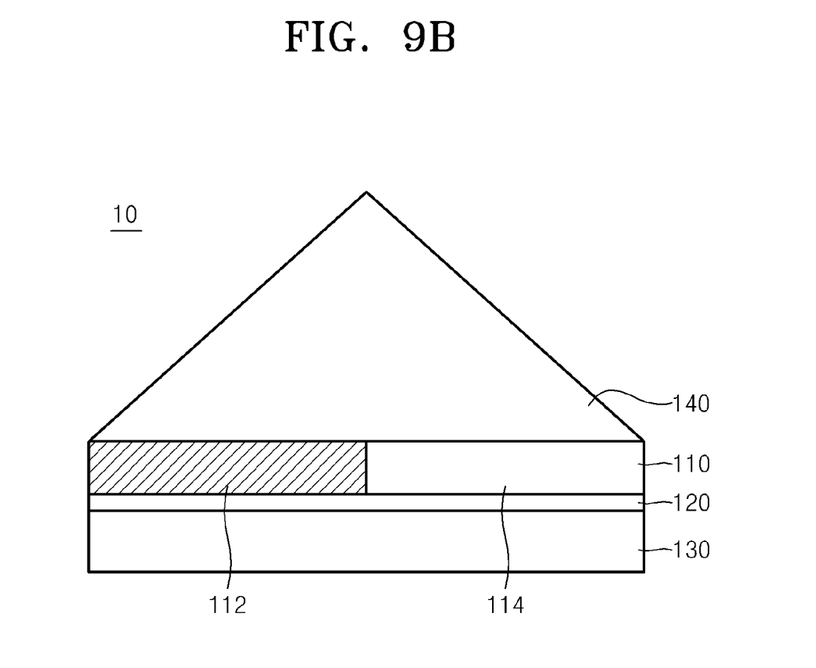
Figure 9C:
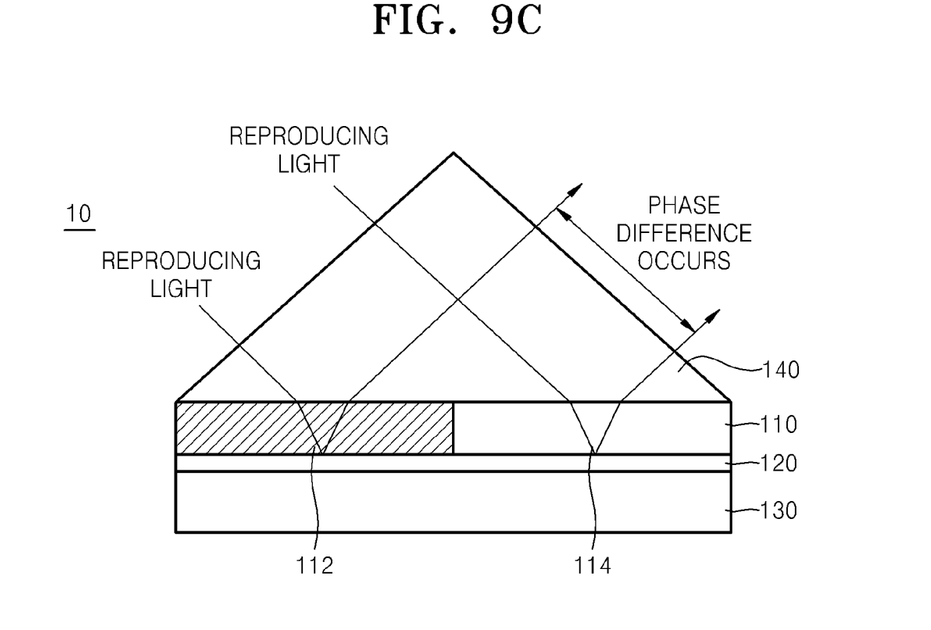

FIGS. 9A through 9C are drawings describing a process in which a spatial light modulator according to some example embodiments outputs phase-changed light.

As illustrated in FIG. 9A, recording light with hologram information is irradiated on a partial region of a refraction layer 300 placed on a metal thin film 120 in a spatial light modulator 10'. The refraction layer 300 may be formed of a material of which a refractive index may be changed according to an intensity of the recording light with hologram information while an electric field is not formed. Examples of such a material may be vanadium oxides and photochromic materials. In the foregoing case, a transparent electrode is not necessary on the refraction layer 300. However, the refraction layer 300 may be formed of a material of which a refractive index may be changed according to an intensity of the recording light including hologram information while an electric field is formed. The material used to form the refraction layer 300 may be at least one of photorefractive crystals, photorefractive polymers, photorefractive PDLC, photorefractive LC, and Mott insulators. A transparent electrode (not illustrated) may be placed on the foregoing refraction layer 300.

When the recording light with hologram information is irradiated on the partial region of the refraction layer 300, as illustrated in FIG. 9B, a refractive index of the partial region is changed and the refraction layer 300 becomes a refraction layer 110 including a plurality of regions with different refractive indices. In the refraction layer 110, a region in which a refractive index is changed is a first region 112, and a region in which a refractive index is not changed is a second region 114. The spatial light modulator 10 of FIG. 1 is illustrated in FIG. 9B, but the process is not limited thereto. That is, the process may be applied to all of the spatial modulators described above. The refractive indices of the refraction layer 110 may be changed according to an intensity of the recording light with hologram information.

When reproducing light is incident on the refraction layer 110, surface plasmons are generated at an interface between the refraction layer 110 and the metal thin film 120, and a phase difference between light reflected by the first region 112 and light reflected by the second region 114 may occur. The phase difference may include a phase difference due to the refractive index of the refraction layer 110 where the light is transmitted and a phase difference due to surface plasmons.

The spatial light modulators described above may be applied to an apparatus for holography 3D display.

Figure 10:
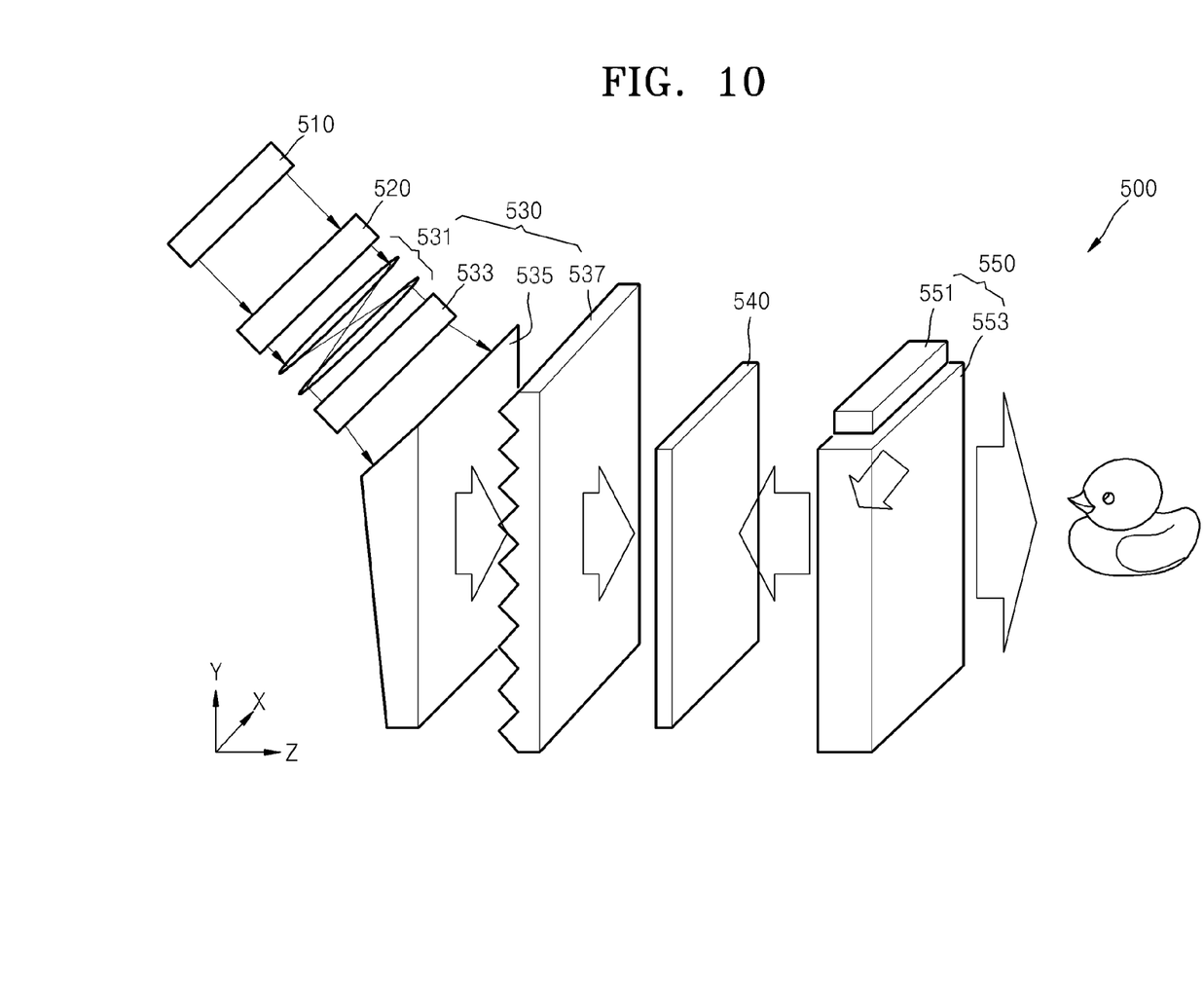
FIG. 10 is a schematic perspective view of a holographic 3-dimensional display apparatus including a spatial light modulator, according to some example embodiments.

FIG. 10 is a schematic perspective view of a holographic 3D display apparatus 500 including a spatial light modulator according to some example embodiments. Referring to FIG. 10, the holographic 3D display apparatus 500 includes a recording light source unit 510 that emits recording light, an electrically addressable spatial light modulator (EASLM) 520 that time sequentially modulates the recording light emitted by the recording light source unit 510 according to hologram information corresponding to a 3D image spatially divided into a plurality of portions, an optically addressable spatial light modulator (OASLM) 540 that includes a plurality of regions corresponding to the plurality of divided portions and of which at least one region among the plurality of regions is illuminated with the modulated recording light to form a hologram, a scanning optical unit 530 that transmits the recording light time sequentially modulated by the EASLM 520 to corresponding regions from among the regions of the OASLM 540, and a reproducing light source unit 550 that produces surface light and emits the surface light to the OASLM 540.

The recording light source unit 510 may be a coherent laser or an incoherent light source. The recording light source unit 510 may emit short wavelength light, for example, blue wavelength light or light in an i-line wavelength band (e.g., high-intensity line at about 365.4 nm in the spectrum of an ultraviolet (UV) lamp), to improve a spatial resolution of the OASLM 540.

The EASLM 520, which modulates the recording light emitted from the recording light source unit 510 according to the hologram information, may include one selected from the group consisting of a digital micromirror device (DMD), a liquid crystal on silicon (LCoS) device, and a liquid crystal device (LCD). The hologram information provided to the EASLM 520 may be a computer generated hologram. Thus, the light output from the EASLM 520 may be the reproducing light including the hologram information.

The spatial light modulators 10 through 80 illustrated in FIGS. 1 through 8 may be applied to the OASLM 540, in which the hologram is formed by imaging the light modulated by the EASLM 520.

The scanning optical unit 530 transmits a modulated recording light according to the hologram information in the EASLM 520 to the OASLM 540. The scanning optical unit 530, which is an optical system that replicates the modulated recording light in the OASLM 540 at a reduced scale, may have a relatively slim structure with a relatively small volume. For this, the scanning optical unit 530 may include a projection optical unit 531, a scanning active optical device 533 that controls a proceeding direction of the modulated recording light, a beam folding optical panel 535 that guides the modulated recording light incident thereon via the scanning active optical device 533 by total internal reflection and emits the modulated recording light from a desired (or alternatively, predetermined) position, and a directional optical panel 537 that controls a direction of the modulated recording light emitted from the beam folding optical panel 535.

The reproducing light source unit 550 emits reproducing light to the hologram formed in the OASLM 540. The reproducing light source unit 550 includes a light source 551, and a transparent optical panel 553 that faces the OASLM 540 and emits the light incident from the light source 551 to the OASLM 540. Then, the OASLM 540 outputs a hologram image formed in the OASLM 540 by an operation between hologram and the reproducing light. Therefore, the reproducing light emitted to the OASLM 540 from the reproducing light source unit 550 corresponds to the reproducing light described in FIGS. 1 through 8.

As mentioned above, an apparatus for holography 3D display may be implemented with a high spatial resolution because a spatial light modulator for generating surface plasmons is applied.

Because the spatial light modulators of the present disclosure use a refraction layer including regions with refractive indices different from each other, changing a phase of light is convenient.

Also, an implementation of a relatively small volume spatial light modulator is possible because a phase of light is changed due to surface plasmons between a refraction layer and a metal thin film.

In addition, a phase control is convenient because a phase of light is controlled by controlling a refractive index of a refraction layer.

By applying the foregoing spatial light modulators, a spatial resolution of an apparatus for holography display may be improved.

While example embodiments have been particularly shown and described, it will be understood by those of ordinary skill in the art that various changes in form and details may be made therein without departing from the spirit and scope of the present invention as defined by the following claims.

What is claimed is:

1. A spatial light modulator, comprising:
   a refraction layer including a first region and a second region with refractive indices different from each other; and
   a metal thin film on a lower face of the refraction layer that is configured to generate surface plasmons due to light incident on the metal thin film via the refraction layer;
   wherein the first region and the second region are arranged in a direction perpendicular to a width direction of the refraction layer such that, in response to first light with a first phase incident on the refraction layer, second light with a second phase is reflected by the first region and third light with a third phase, different from the second phase, is reflected by the second region.

2. The spatial light modulator of claim 1, wherein the first region is a region in which a refractive index is changed due to emission of fourth light including hologram information before the first light is incident on the first region.

3. The spatial light modulator of claim 2, wherein the change of the refractive index differs depending on an intensity of the fourth light.

4. The spatial light modulator of claim 1, wherein the refraction layer is formed of vanadium oxide or photochromic material.

5. The spatial light modulator of claim 1, further comprising:
a dielectric layer on a lower face of the metal thin film.

6. The spatial light modulator of claim 1, further comprising:
a prism on the refraction layer that is configured to control an incident angle of the first light toward the metal thin film.

7. The spatial light modulator of claim 6, wherein an incident plane of the prism comprises a plane parallel to a transmittance plane of the prism.

8. The spatial light modulator of claim 1, further comprising:
a prism array on the refraction layer in which a plurality of prisms are aligned to control an incident angle of the first light toward the metal thin film.

9. The spatial light modulator of claim 1, further comprising:
a transparent electrode on the refraction layer that is configured to apply a voltage to form an electric field through the refraction layer.

10. The spatial light modulator of claim 9, wherein the refraction layer is formed from one or more of photorefractive crystals, photorefractive polymers, photorefractive polymer dispersed liquid crystals (PDLC), photorefractive liquid crystals (LC), and Mott insulators.

11. The spatial light modulator of claim 9, further comprising:
a prism on the transparent electrode that is configured to control an incident angle of the first light toward the metal thin film.

12. The spatial light modulator of claim 1, wherein the phase difference between the second phase and the third phase includes a phase difference due to a refractive index of the refraction layer, where the first light is transmitted, and a phase difference due to surface plasmons.

13. A holographic three-dimensional (3D) display apparatus, comprising:
a recording light source unit configured to emit recording light;
a first spatial light modulator configured to time-sequentially modulate the recording light emitted from the recording light source unit to include hologram information corresponding to a 3D image spatially divided into a plurality of portions;
a second spatial light modulator corresponding to the spatial light modulator of claim 1, including a plurality of regions corresponding to the plurality of portions, wherein at least one region among the plurality of regions is configured to be illuminated with the modulated recording light to form a hologram; and
a reproducing light source unit configured to produce surface light and configured to emit the surface light to the second spatial light modulator.

14. The apparatus of claim 13, further comprising:
a scanning optical unit configured to replicate at a reduced scale a hologram generated by the recording light source unit, time-sequentially modulated by the first spatial light modulator, and configured to transmit the hologram to corresponding regions from among the plurality of regions of the second spatial light modulator.

15. A method of modulating spatial light, the method comprising:
placing a refraction layer, including a first region and a second region, on a metal thin film;
changing a refractive index of the first region by irradiating first light including hologram information onto the first region; and
generating surface plasmons at an interface between the refraction layer and the metal thin film in response to second light with a first phase incident on the refraction layer, and causing third light with a second phase reflected by the first region and fourth light with a third phase reflected by the second region.

16. The method of claim 15, wherein the change of the refractive index is different according to an intensity of the first light.

17. The method of claim 15, wherein the refraction layer is formed of vanadium oxide or photochromic material.

18. The method of claim 15, wherein the refraction layer is formed of material in which a refractive index is changed due to the first light under an electric field.

19. The method of claim 18, wherein the refraction layer is formed from one or more of photorefractive crystals, photorefractive polymers, photorefractive polymer dispersed liquid crystals (PDLC), photorefractive liquid crystals (LC), and Mott insulators.

20. The method of claim 15, wherein the phase difference between the second phase and the third phase includes a phase difference due to a refractive index of the refraction layer, where the second light is transmitted, and a phase difference due to surface plasmons.

* * * * *